(12) United States Patent
Kamada et al.

(10) Patent No.: US 12,486,131 B2
(45) Date of Patent: Dec. 2, 2025

(54) PRINT MEDIUM IDENTIFICATION METHOD AND PRINT MEDIUM IDENTIFICATION SYSTEM

(71) Applicant: SEIKO EPSON CORPORATION, Tokyo (JP)

(72) Inventors: Takahiro Kamada, Matsumoto (JP); Mitsuhiro Yamashita, Matsumoto (JP); Takuya Ono, Shiojiri (JP); Yuko Yamamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 315 days.

(21) Appl. No.: 18/165,224

(22) Filed: Feb. 6, 2023

(65) Prior Publication Data

US 2023/0264908 A1 Aug. 24, 2023

(30) Foreign Application Priority Data

Feb. 7, 2022 (JP) .................... 2022-017116

(51) Int. Cl.
*B65H 7/02* (2006.01)
*B41J 11/00* (2006.01)
(Continued)

(52) U.S. Cl.
CPC ............. *B65H 7/02* (2013.01); *B41J 11/009* (2013.01); *G01N 33/346* (2013.01); *G06V 10/82* (2022.01);
(Continued)

(58) Field of Classification Search
CPC ............... B65H 7/02; B65H 2511/413; B65H 2511/416; B41J 11/009; G01N 33/346; G06V 10/82; G06V 10/454; G06V 10/764; G06V 20/60; H04N 1/00724; G06N 3/08; G06N 3/0464; G06N 3/045
(Continued)

(56) References Cited

U.S. PATENT DOCUMENTS 11,210,046 B2    12/2021  Shikagawa et al.
2019/0098142 A1   3/2019  Ozawa
(Continued)

FOREIGN PATENT DOCUMENTS

JP    2006-154913 A    6/2006
JP    2019-055554 A    4/2019
(Continued)

*Primary Examiner* — Charlotte M Baker
(74) *Attorney, Agent, or Firm* — WORKMAN NYDEGGER

(57) ABSTRACT

The print medium identification method includes (a) a step of obtaining first physical property information about a print medium, (b) a step of obtaining second physical property information which is different from the first physical property information about the print medium, (c) a step of obtaining first discrimination information for discriminating a type of print medium by inputting the first physical property information to a first discriminator, (d) a step of obtaining second discrimination information for discriminating the type of print medium by inputting second physical property information to a second discriminator, and (e) a step of identifying the type of print medium by using the first discrimination information and the second discrimination information.

13 Claims, 8 Drawing Sheets

(51) Int. Cl.
  *G01N 33/34* (2006.01)
  *G06V 10/82* (2022.01)
  *H04N 1/00* (2006.01)
  *G06N 3/08* (2023.01)
(52) U.S. Cl.
  CPC ... *H04N 1/00724* (2013.01); *B65H 2511/413* (2013.01); *B65H 2511/416* (2013.01); *G06N 3/08* (2013.01)
(58) Field of Classification Search
  USPC ............................................................ 382/156
  See application file for complete search history.

(56) References Cited

U.S. PATENT DOCUMENTS

| | | |
|---|---|---|
| 2019/0272209 A1 | 9/2019 | Yeung et al. |
| 2019/0322476 A1 | 10/2019 | Miyazaki |
| 2020/0233737 A1 | 7/2020 | Yeung et al. |
| 2020/0249892 A1 | 8/2020 | Shikagawa et al. |
| 2020/0279148 A1 | 9/2020 | Motoki et al. |
| 2021/0195033 A1* | 6/2021 | Kawano ............. H04N 1/00657 |
| 2021/0397503 A1 | 12/2021 | Yeung et al. |

FOREIGN PATENT DOCUMENTS

| | | |
|---|---|---|
| JP | 2019153306 | 9/2019 |
| JP | 2019-188627 A | 10/2019 |
| JP | 2020121503 | 8/2020 |
| JP | 2020139914 | 9/2020 |
| JP | 2021-059451 A | 4/2021 |

* cited by examiner

| MEDIUM IDENTIFIER | MEDIUM NAME | CLASS | DATA SUB NO. | FIRST PHYSICAL PROPERTY INFORMATION R1 (λ) | SECOND PHYSICAL PROPERTY INFORMATION R2 (θ) |
|---|---|---|---|---|---|
| A-1 | MEDIUM 1 | 1 | 0 | ............ | ............ |
| | | | 1 | ............ | ............ |
| | | | 2 | ............ | ............ |
| A-2 | MEDIUM 2 | 2 | 0 | ............ | ............ |
| | | | 1 | ............ | ............ |
| | | | 2 | ............ | ............ |
| ... | ... | ... | ... | ............ | ............ |
| A-m | MEDIUM m | m | 0 | ............ | ............ |
| | | | 1 | ............ | ............ |
| | | | 2 | ............ | ............ |

IDL

FIG. 6

| MEDIUM IDENTIFIER | PRINT SETTINGS | | |
|---|---|---|---|
| | PRINTER PROFILE | MEDIUM FEED SPEED | DRYING TIME |
| A-1 | PR1 | FS1 | DT1 |
| A-2 | PR2 | FS2 | DT2 |
| ... | ... | ... | ... |
| ... | ... | ... | ... |
| A-m | PRm | FSm | STm |

PST

FIG. 7

| No. | LAYER NAME | LABEL Lb | KNOWN FEATURE SPECTRUM KSp |
|---|---|---|---|
| 1 | ConvVN2 | 1 | ................................. |
| 2 | ConvVN2 | 1 | ................................. |
| ... | ... | ... | ................................. |
| 1_max | ConvVN2 | 1 | ................................. |
| 1 | ConvVN2 | 2 | ................................. |
| 2 | ConvVN2 | 2 | ................................. |
| ... | ... | ... | ................................. |
| 2_max | ConvVN2 | 2 | ................................. |
| ... | ... | ... | ................................. |
| ... | ... | ... | ................................. |
| m_max | ConvVN2 | m | ................................. |

PRINT MEDIUM IDENTIFICATION METHOD AND PRINT MEDIUM IDENTIFICATION SYSTEM

The present application is based on, and claims priority from JP Application Serial Number 2022-017116, filed Feb. 7, 2022, the disclosure of which is hereby incorporated by reference herein in its entirety.

BACKGROUND

1. Technical Field

The present disclosure relates to a print medium identification method and a print medium identification system.

2. Related Art

JP-A-2021-59451 discloses a technique for determining the type of recording medium. In the related art, the type of recording medium is determined by inputting a specular light intensity value, a diffuse reflected light intensity value, a value related to the basis weight of the recording medium, and a value related to the thickness or density of the recording medium into a machine learned model for paper type determination.

However, in the related art, it is difficult to identify a type of print medium with a subtle difference when a single machine learning model is generated using multiple types of physical property information, because even if certain physical property information has outstanding features, they may be averaged out.

SUMMARY

According to a first aspect of the present disclosure, a print medium identification method for identifying a type of print medium is provided. The method includes: (a) a step of obtaining first physical property information about a print medium; (b) a step of obtaining second physical property information, which is different from the first physical property information, about the print medium; (c) a step of obtaining first discrimination information for discriminating the type of print medium by inputting the first physical property information to a first discriminator configured as a pre-trained machine learning model; (d) a step of obtaining second discrimination information for discriminating the type of print medium by inputting the second physical property information to a second discriminator configured as a pre-trained machine learning model; (e) a step of identifying the type of print medium using the first discrimination information and the second discrimination information According to a second aspect of the present disclosure, a print medium identification system is provided that executes a medium identification process to identify a type of print medium. The system includes; a memory for storing a first discriminator and a second discriminator configured as pre-trained machine learning models, and a processor for executing the medium identifying process by using the first discriminator and the second discriminator, wherein the processor executes: (a) a process of obtaining first physical property information about a print medium; (b) a process of obtaining second physical property information which is different from the first physical property information about the print medium; (c) a process of obtaining first discrimination information for discriminating the type of print medium by inputting the first physical property information to the first discriminator; (d) a process of obtaining second discrimination information for discriminating the type of print medium by inputting the second physical property information to the second discriminator; and (e) a process of identifying the type of print medium using the first discrimination information and the second discrimination information

BRIEF DESCRIPTION OF THE DRAWINGS

FIG. 6 is a diagram showing a medium identifier list.

FIG. 7 is a diagram showing a print setting table.

DESCRIPTION OF EMBODIMENTS

Figure 1:
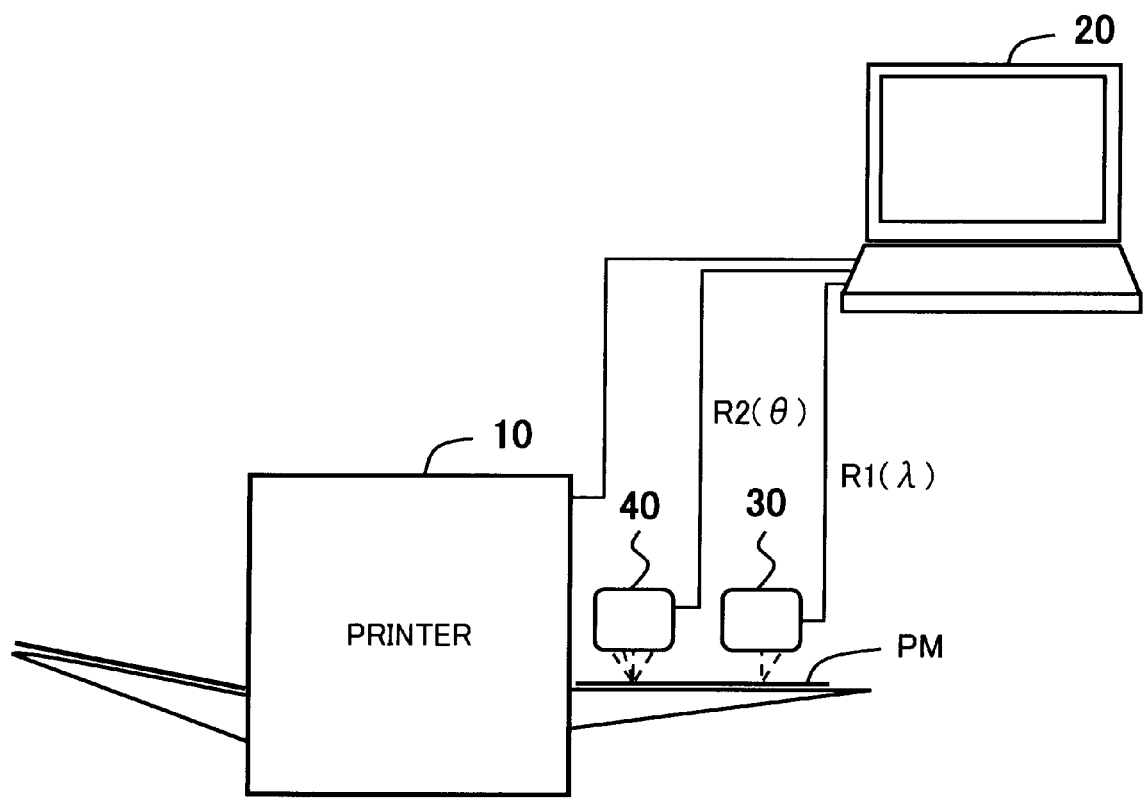
FIG. 1 is a block diagram of a print system according to an embodiment.

FIG. 1 is a block diagram showing a print system according to one embodiment. The print system includes a printer 10, an information processing apparatus 20, a spectral reflectance measuring instrument 30, and a reflectance distribution measuring instrument 40.

The spectral reflectance measuring instrument 30 performs spectacle measurement of an unprinted print medium PM, which is used in the printer 10, and obtains spectral reflectance $R1(\lambda)$ as first physical property information. The spectral reflectance $R1(\lambda)$ indicates the reflectance of reflected light which is incident on the surface of the print medium PM at one specific angle of incidence and reflected at one specific angle of reflection, for multiple wavelengths A. The reflectance distribution measuring instrument 40 performs measurement of an unprinted print medium PM, which is used in the printer 10, and obtains reflectance distribution $R2(\theta)$ as second physical property information. The reflectance distribution $R2(\theta)$ indicates the reflectance ratio of light which is incident on the print medium PM at one or more incidence angles and reflected at multiple reflection angles $\theta$ separately for each incidence angle. In this embodiment, the reflectance ratio at multiple reflection angles is used for only one angle of incidence.

Other types of physical property information other than the spectral reflectance $R1(\lambda)$ or the reflectance distribution $R2(\theta)$ can be used as the first physical property information and the second physical property information about the print medium PM. For example, each of the first physical property information and the second physical property information may include one or more of spectral reflectance, spectral transmittance, reflectance distribution, image captured by a visible light camera, thickness, moisture content, weight, friction coefficient, and ultrasonic inspection image. The weight per unit area should be used as the weight. Since the image captured by the visible light camera represents the surface texture of the print medium PM, the type of the print medium PM can be identified according to the difference in texture. Further, since the ultrasonic inspection image represents the internal structure of the print medium PM, the type of the print medium PM can be identified according to the difference in the internal structure. By using such various types of physical property information, the type of the print medium PM can be identified according to various types of physical property information about the print medium PM. When physical property information other than the spectral reflectance $R1(\lambda)$ and the reflectance distribution $R2(\theta)$ is used, a suitable measuring instrument for each is used. It is desirable to combine information expressed in one value, such as thickness, moisture content, weight, friction coefficient, and the like, with other information to form two or more types of information to constitute the first physical property information and the second physical property information. However, the first physical property information and the second physical property information are information that differs from each other. The meaning of "the first physical property information and the second physical property information differ from each other" means that at least one type of information contained in each is different.

As will be described later, the information processing apparatus 20 inputs the spectral reflectance $R1$ ($\lambda$) and the reflectance distribution $R2$ ($\theta$) to the first discriminator and the second discriminator to obtain the first discrimination information and the second discrimination information that identify the type of the print medium, and uses these sets of discrimination information to identify the type of the print medium PM. The information processing apparatus 20 further controls the printer 10 to execute printing under the appropriate printing conditions according to the type of the identified print medium PM.

Figure 2:
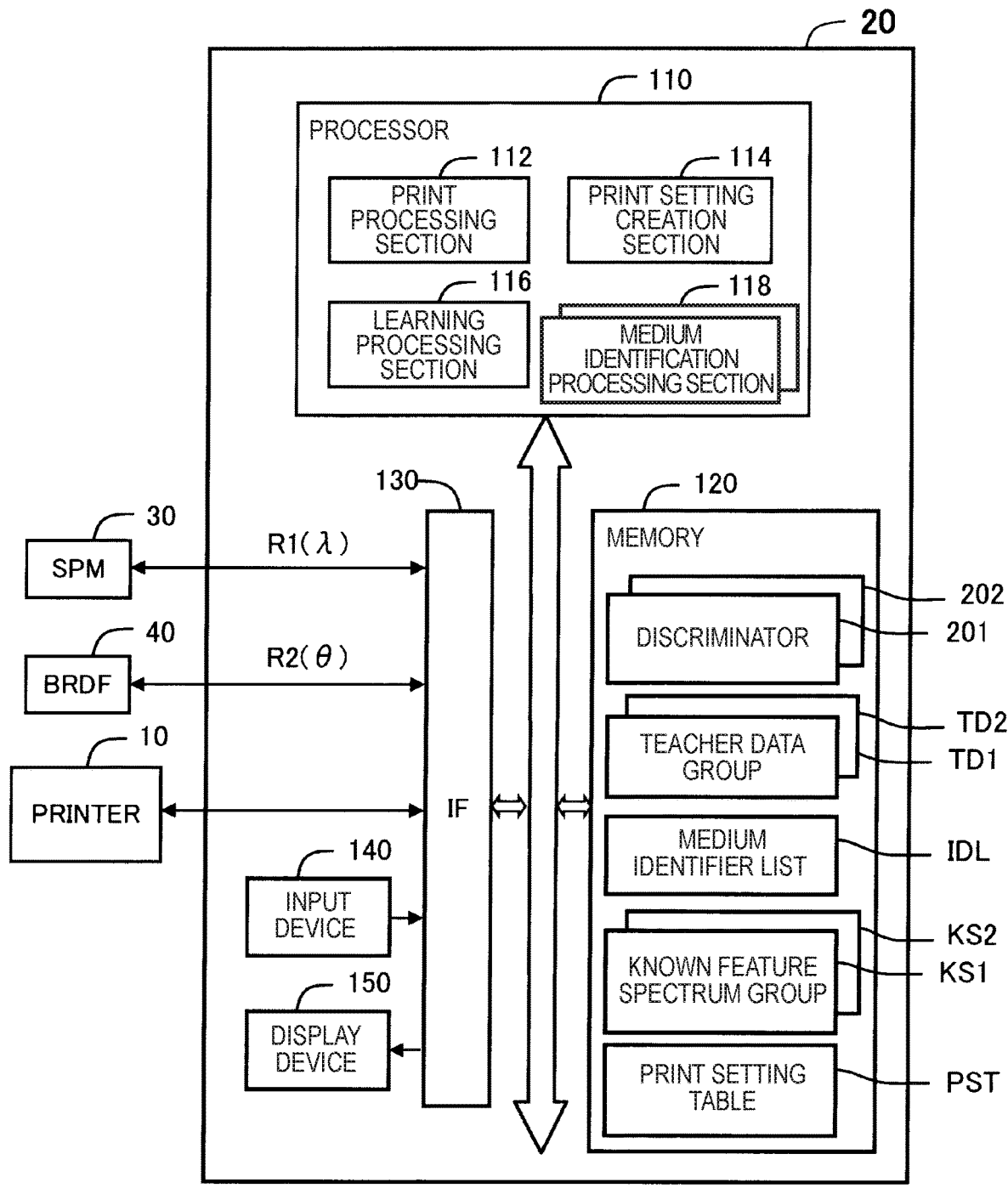
FIG. 2 is a block diagram of an information processing apparatus.

FIG. 2 is a block diagram showing the functions of the information processing apparatus 20. The information processing apparatus 20 has a processor 110, a memory 120, an interface circuit 130, and an input device 140 and a display device 150, which are connected to the interface circuit 130. The printer 10, the spectral reflectance measuring instrument 30, and the reflectance distribution measuring instrument 40 are also connected to the interface circuit 130. The processor 110 not only has the function of executing the processes detailed below, but also has the function of displaying, on the display device 150, the data obtained by and generated in the course of said processing.

The processor 110 operates to perform the functions of a print processing section 112, a print setting creation section 114, a learning processing section 116, a medium and identification processing section 118. The print processing section 112 executes the printing process using the printer 10. The print setting creation section 114 creates print settings suitable for the type of print medium PM. The medium identification processing section 118 executes medium identification process to identify the type of print medium PM. The functions of these sections 112, 114, 116, and 118 are realized by the processor 110 executing a computer program stored in the memory 120. However, the functions of these sections 112, 114, 116, and 118 may be realized by hardware circuitry. The "processor" in this disclosure is a term that also includes such hardware circuitry. Further, the processor for executing various processes may be a processor included in a remote computer connected to the information processing apparatus 20 via a network.

The memory 120 stores discriminators 201 and 202, teacher data groups TD1 and TD2, medium identifier list IDL, known feature spectrum groups KS1 and KS2, and a print setting table PST. The first discriminator 201 is used in the process of obtaining the first discrimination information that determines the type of print medium according to the spectral reflectance R1 ($\lambda$) as the first physical property information. The second discriminator 202 is used in the process of obtaining the second discrimination information that determines the type of print medium according to the reflectance distribution R2 ($\theta$) as the second physical property information. Examples of the configuration and operation of the discriminators 201 and 202 will be described later. The teacher data groups TD1 and TD2 are a set of labeled data used to train the discriminators 201 and 202. The medium identifier list IDL is a list in which medium identifiers and physical property information are registered for each type of print medium. The known feature spectrum groups KS1 and KS2 are the set of feature spectrum obtained when the teacher data is input again to the pre-trained discriminators 201 and 202. The feature spectrum will be described later. The print setting table PST is a table in which the print settings appropriate for the type of print medium are registered.

Figure 3:
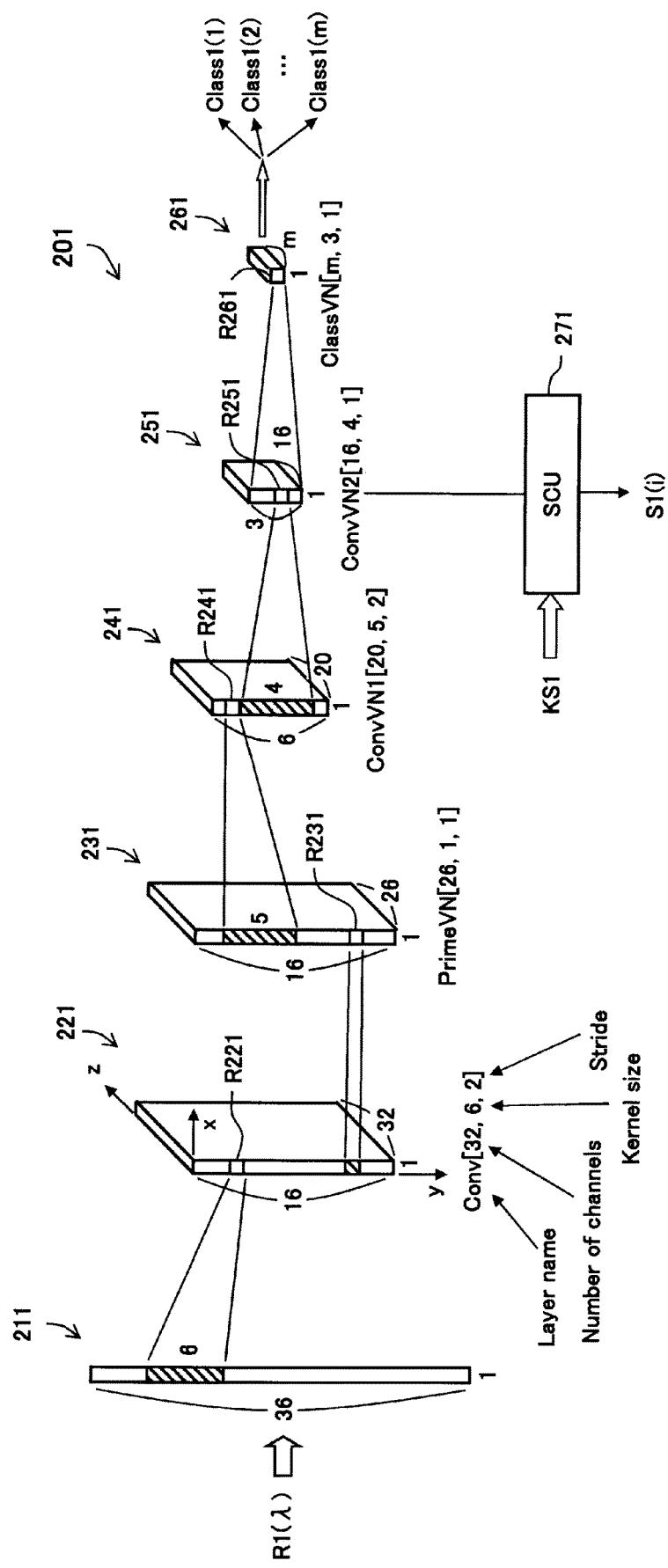
FIG. 3 is a configuration of a first discriminator.

FIG. 3 is an explanatory diagram showing configuration of the first discriminator 201. The first discriminator 201 is a vector neural network with, in this order from an input layer 211 to which the spectral reflectance R1 ($\lambda$) are input, a convolutional layer 221, a primary vector neuron layer 231, a first convolutional vector neuron layer 241, and a the second convolutional vector neuron layer 251 as intermediate layers, and a classification vector neuron layer 261 as an outputting layer. Of these six layers 211 to 261, the input layer 211 is the lowest layer and the classification vector neuron layer 261 is the highest layer. In the following description, the layers 221 to 261 are also referred to as "Conv layer 221", "PrimeVN layer 231", "ConvVN1 layer 241", "ConvVN2 layer 251", and "ClassVN layer 261", respectively.

In this embodiment, the data input to the input layer 211 is the spectral reflectance $R1(\lambda)$, which is one dimensional array data. For example, the spectral reflectance $R1(\lambda)$ is the data obtained by extracting 36 representative values every 10 nm from the data in the range of 380 nm to 730 nm.

The configuration of layers 221 to 261 can be described as follows.

Description of Configuration of the First Discriminator 201
 Conv layer 221: Conv[32,6,2]
 PrimeVN layer 231: PrimeVN[26,1,1]
 ConvVN1 layer 241: ConvVN1[20,5,2]
 ConvVN2 layer 251: ConvVN2[16,4,1]
 ClassVN layer 261: ClassVN[n1+1,3,1]
 Vector dimension VD: VD=16

In each of these descriptions of layers 221 to 261, the character string before the parentheses is layer name, and the numbers in parentheses are, in order, number of channels, kernel size, and stride. For example, the layer name of the Conv layer 221 is "Conv", the number of channels is 32, the kernel size is 1×6, and the stride is 2. In FIG. 3, these descriptions are shown below each layer. The hatched rectangles drawn in each layer represent the kernels used to calculate the output vectors to be output to the adjacent upper layers. In this embodiment, since the input data is a one dimensional array of data, the kernel also has a one dimensional array. Note that the values of the parameters used in the description of each layer 221 to 261 are examples and can be changed arbitrarily.

The Conv layer 221 is a layer composed of scalar neurons. The four layers 231 to 261 on the upper side of the Conv layer are composed of vector neurons. Vector neurons are neurons that have vectors as input and output. In the above description, the dimension of the output vector of each vector neuron is constant at 16. Hereinafter, the term "node" is used as a superordinate concept of the scalar neurons and the vector neurons.

In FIG. 3, Conv layer 221 shows a first axis x and a second axis y, which define the planar coordinates of the node array, and a third axis z, which represents the depth. Also shown are the sizes of the Conv layer 221 in the x, y, and z directions of 1, 16, and 32, respectively. The size in the x direction and the size in the y direction are called "resolution". In this embodiment, the resolution in the x direction is always 1. The size in the z direction is the number of channels. These three axes x, y, and z are also used as coordinate axes for the position of each node in the other layers. However, in FIG. 3, these axes x, y, and z are not shown in layers other than the Conv layer 221.

As is well known, a resolution W1 in the y direction after convolution is given by following equation.

$$W1 = \text{Ceil}\{(W0-Wk+1)/S\} \quad (1)$$

Here, W0 is the resolution before convolution, Wk is the kernel size, S is the stride, and Ceil{X} is a function that performs the operation to round up X to the nearest whole number.

The resolution of each layer shown in FIG. 3 is an example for when the resolution of the input data in the y direction is 36, and the actual resolution of each layer will change according to the size of the input data.

The ClassVN layer 261 has m number of channels. These channels output the classification output values Class1(1) to Class1(m), which correspond to m number of classes. If the maximum value in these classification output values Class1(1) to Class1(m) is greater than a predetermined threshold value, then the class corresponding to the maximum value can be determined to be the class to which the input data belongs. On the other hand, if the maximum value in these classification output values Class1(1) to Class1(m) is less than the threshold value, the class of the input data can be determined to be unknown. In general, m is an integer greater than or equal to 2 and is the number of known classes that can be classified using the first discriminator 201. Instead of the classification output values Class1(1) to Class1(m), the class of the input data can be determined using the similarity S1(i) for each class, as will be described later.

FIG. 3 further shows partial regions Rn in layers 221, 231, 241, 251, and 261. The subscript "n" of the partial region Rn is the layer number of each layer. For example, the partial region R221 indicates a partial region in the Conv layer 221. The "partial region Rn" is a region in each layer that contains a plurality of channels along the third axis z, at a planar position (x, y) defined by the position x of the first axis x and the position y of the second axis y. The partial region Rn has a dimension of "Width"×"Height"×"Depth" corresponding to the first axis x, the second axis y, and the third axis z. In this embodiment, the number of nodes in one "partial region Rn" is "1×1×number of depth", that is, the "1×1×number of channels".

The first discriminator 201 further has a similarity calculation section 271 that calculates the similarity S1(i). The similarity calculation section 271 calculates the feature spectrum, will be described later, from the output of the ConvVN2 layer 251, and calculates the similarity S1(i) for each class by using the feature spectrum. Here, i is a parameter indicating the class and takes values from 1 to m.

In this disclosure, the vector neuron layer used to calculate the similarity S1(i) is also referred to as a "specific layer". Vector neuron layers other than the ConvVN2 layer 251 may be used as specific layers, and any number of one or more vector neuron layers may be used as a specific layer. The composition of the feature spectrum and a method of calculating the similarity using the feature spectrum are described later.

The vector neural network used in this embodiment is configured on the same principle as the vector neural network described in US2021/0374534, which was disclosed by the applicant of this disclosure.

Figure 4:
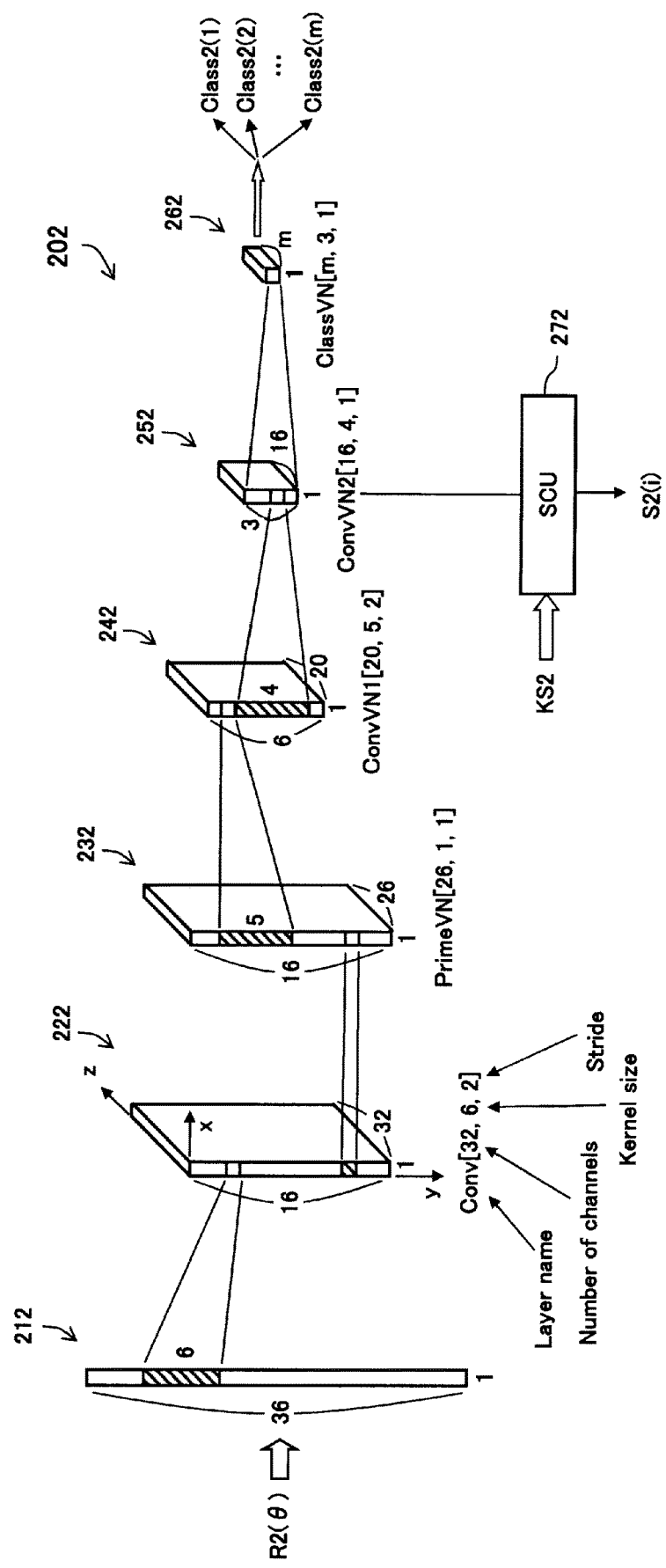
FIG. 4 is a configuration of a second discriminator.

FIG. 4 is an explanatory diagram showing configuration of the second discriminator 202. Like the first discriminator 201, the second discriminator 202 has an input layer 212, a Conv layer 222, PrimeVN layer 232, an ConvVN1 layer 242, and an ConvVN2 layer 252 as intermediate layers, a ClassVN layer 262 as an output layer, and a similarity calculation section 272.

As can be understood by comparing FIGS. 3 and 4, layers 212 to 262 of the second discriminator 202 have the same configuration as layers 211 to 261 of the first discriminator 201. In addition, the ClassVN layer 262, which is the output layer of the second discriminator 202, outputs classification output values Class2(1) to Class2(m) corresponding to same m number of known classes as in the first discriminator 201. In other words, the second discriminator 202 is configured to perform the same discrimination process for the same m types of print media as the first discriminator 201. The only difference between the second discriminator 202 and the first discriminator 201 is that a reflectance distribution R2 (θ) is input to the input layer 212. In this embodiment, the reflectance distribution R2 (θ) is 36 one dimensional data, containing the reflectance ratio at 36 reflection angles θ for one specific input angle. However, the number of reflection angles θ can be changed arbitrarily. The similarity calculation section 272 calculates the feature spectrum from the output of the ConvVN2 layer 252, and calculates similarity S2(i) for each class by using the feature spectrum.

Figure 5:
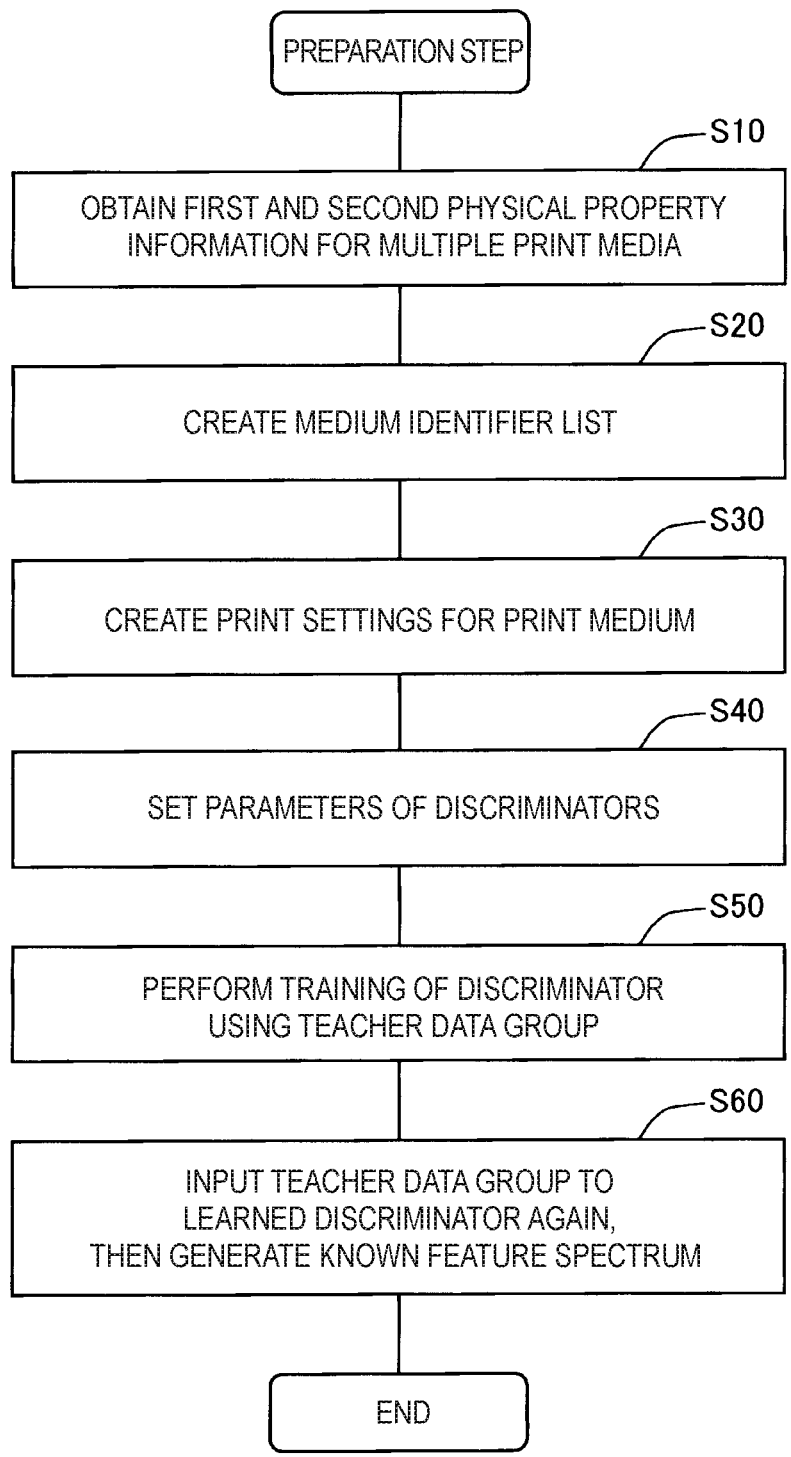
FIG. 5 is a flowchart showing a processing procedure of a preparation step.

FIG. 5 is a flowchart showing the processing procedure of a preparation step of the discriminators 201 and 202. This preparation step is, for example, a process performed by the manufacturer of the printer 10.

In step S10, the first physical property information and the second physical property information are obtained for each of plural print media. As mentioned above, in this embodiment, the first physical property information is the spectral reflectance R1(λ), which is measured using the spectral reflectance measuring instrument 30. The second physical property information is the reflectance distribution R2(θ), which is measured using the reflectance distribution measuring instrument 40. These measurements are desirably performed at multiple locations on the same print media. In addition, considering the variation in measurement results, data expansion is desirable. In general, measurement results will vary depending on the day the colorimetry was taken and on the measuring instrument. Data expansion is a process for generating multiple measurement results by adding random variations to measurement results to simulate such variations. Specifically, multiple spectral reflectances R1(λ) are created by adding random variations to the spectral reflectance R1(λ) obtained from a single measurement. The same applies to the reflectance distribution R2(θ). The first physical property information and the second physical property information obtained in step S10 are used as the teacher data groups TD1 and TD2.

In step S20, a medium identifier list IDL is created for multiple print media. FIG. 6 is an explanatory diagram showing the medium identifier list IDL. A medium identifier assigned to the individual print medium, a medium name, a class number, a data sub-number, and a representative data for the first physical property information and the second physical property information are registered in the medium identifier list IDL. In this example, the medium identifiers "A-1" to "A-m" are assigned to the m number of print media. The medium name is a name of the print medium that appears in a window used by the user to set print conditions. The data sub-number is a number used to distinguish between multiple data of physical property information about the same print medium. In this example, for each print medium, three spectral reflectances R1(λ) are registered as the first physical property information, and three reflectance distributions R2(θ) are registered as the second physical property information. However, the number of data for the physical property information for each print medium may be different. As for the first physical property information and the second physical property information for each print medium, one or more data should be registered for each, but it is desirable that multiple data be registered. Also, the medium identifier list IDL may be configured not to include the first physical property information and the second physical property information.

In step S30 of FIG. 5, print settings are created for multiple print media, and the print setting creation section 114 registers the print settings in the print setting table PST. FIG. 7 is an explanatory diagram showing the print setting table PST. Each record in the print setting table PST registers a medium identifier and print settings for each print medium. In this example, printer profiles PR1 to PRm, medium feed speeds FS1 to FSm, and drying times DT1 to DTm are registered as the print settings. The printer profiles PR1 to PRm are color profiles for the output of the printer 10 and are created for each print medium. Specifically, a printer profile can be created by printing a test chart on a print medium using the printer 10 without color correction, performing spectacle measurement for the test chart with the spectral reflectance measuring instrument 30, and processing the spectacle measurement result by the print setting creation section 114. The medium feed speeds FS1 to FSm and the drying times DT1 to DTm can also be determined experimentally. The "drying time" is the time required to dry the printed medium after printing by a dryer (not shown) inside the printer 10. In a type of printer that dries printed medium by applying air to the medium after printing, the "drying time" is the air blowing time. For printers without a dryer, the "drying time" is the standby time for natural drying. Although initial items other than these may be set as the print settings, it is desirable to create print settings that include at least a printer profile.

In step S40 of FIG. 5, the user sets the parameters of the discriminators 201 and 202. In step S50, the learning processing section 116 performs training of the discriminators 201 and 202 using the teacher data groups TD1 and TD2, respectively. The first teacher data group TD1 is a set of labeled spectral reflectances R1(λ) for m types of print media. The second teacher data group TD2 is a set of labeled reflectance distributions R2 (θ) for m types of print media. The spectral reflectance R1(λ) and the reflectance distribution R2(θ) were measured in unprinted areas. When the training is completed, the pre-trained discriminators 201 and 202 are stored in the memory 120.

In step S60, the learning processing section 116 inputs the teacher data groups TD1 and TD2 to the pre-trained discriminators 201 and 202 again to generate the known feature spectrum groups KS1 and KS2. The known feature spectrum groups KS1 and KS2 are the sets of feature spectrum described below. The following is mainly explanation of a method of generating the known feature spectrum group KS1, which is mapped to the first discriminator 201.

Figures 8, 9:
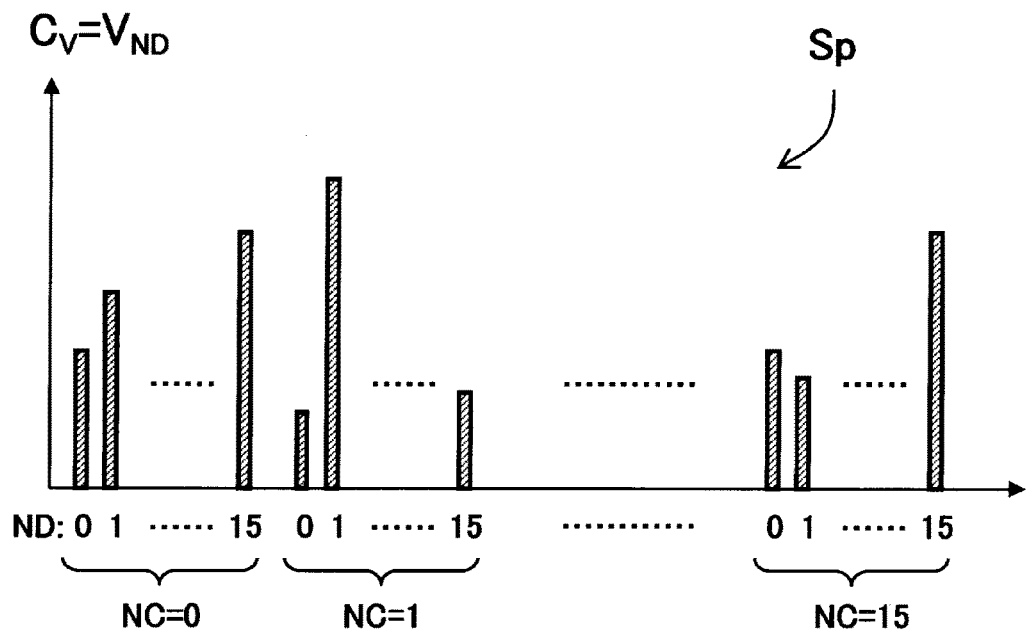
FIG. 8 is a diagram showing feature spectrum.
FIG. 9 is a diagram showing a configuration of known feature spectrum group.

FIG. 8 is an explanatory diagram showing the feature spectrum Sp obtained by inputting arbitrary input data to the pre-trained first discriminator 201. Here, the feature spectrum Sp obtained from the output of the ConvVN2 layer 251 will be described. The horizontal axis of FIG. 8 is the location of spectrum expressed as a combination of the element number ND of node's output vector at one planar location (x, y) of the ConvVN2 layer 251, and the channel number NC. In this embodiment, since the vector dimension of the node is 16, the element number ND of the output vector is 0 to 15, and the number of elements is 16. Since the number of channels in the ConvVN2 layer 251 is 16, the channel number NC is from 0 to 15, that is 16.

The vertical axis in FIG. 8 indicates feature value $C_V$ at each location of spectrum. In this example, the feature value $C_V$ is a value VND of each element of the output vector. The feature value Cy may be a value obtained by multiplying the value VND Of each element of the output vector by the activation value, or the activation value may be used as it is. In the latter case, the number of feature values $C_V$ in the feature spectrum Sp is equal to the number of channels, which is 16. The activation value is equivalent to the vector length of the output vector of the node.

The number of the feature spectrum Sp obtained from the output of the ConvVN2 layer 251 for one input data is equal to the number of planar positions (x, y) of the ConvVN2 layer 251, that is, 1×3=3.

The similarity calculation section 271 inputs the teacher data again to the pre-trained first discriminator 201, then calculates the feature spectrum Sp shown in FIG. 8, and registers the feature spectrum Sp in the known feature spectrum group KS1.

FIG. 9 is an explanatory diagram showing configuration of the known feature spectrum group KS1. Each record of the known feature spectrum group KS1 contains record number, layer name, label Lb, and known feature spectrum KSp. The known feature spectrum KSp is the same as the feature spectrum Sp of FIG. 8 obtained by inputting the teacher data. In the example of FIG. 9, from the output of the ConvVN2 layer 251 obtained when the first teacher data group TD1 is input to the pre-trained first discriminator 201, the known feature spectrum KSp associated with the value of each label Lb is generated and registered. For example, 1_max known feature spectrums KSp are registered in association with the label Lb=1, 2_max known feature spectrums KSp are registered in association with the label Lb=2, and m_max known feature spectrums KSp are registered in association with the label Lb=m. The 1_max, 2_max, and m_max are integers equal to or greater than 2. As mentioned above, each labels Lb correspond to different known classes from each other. Therefore, it can be understood that each known feature spectrum KSp in the known feature spectrum group KS1 is registered in association with one of the m number of known classes.

The known feature spectrum group KS2, which is mapped to the second discriminator 202, is also created in the same way as the known feature spectrum group KS1. Note that the teacher data group used in step S60 need not be the same as the multiple teacher data groups TD1 and TD2 used in step S50. However, if some or all of the multiple teacher data groups TD1 and TD2 used in step S50 are also used in step S60, there is an advantage in that there is no need to prepare new teacher data.

Figure 10:
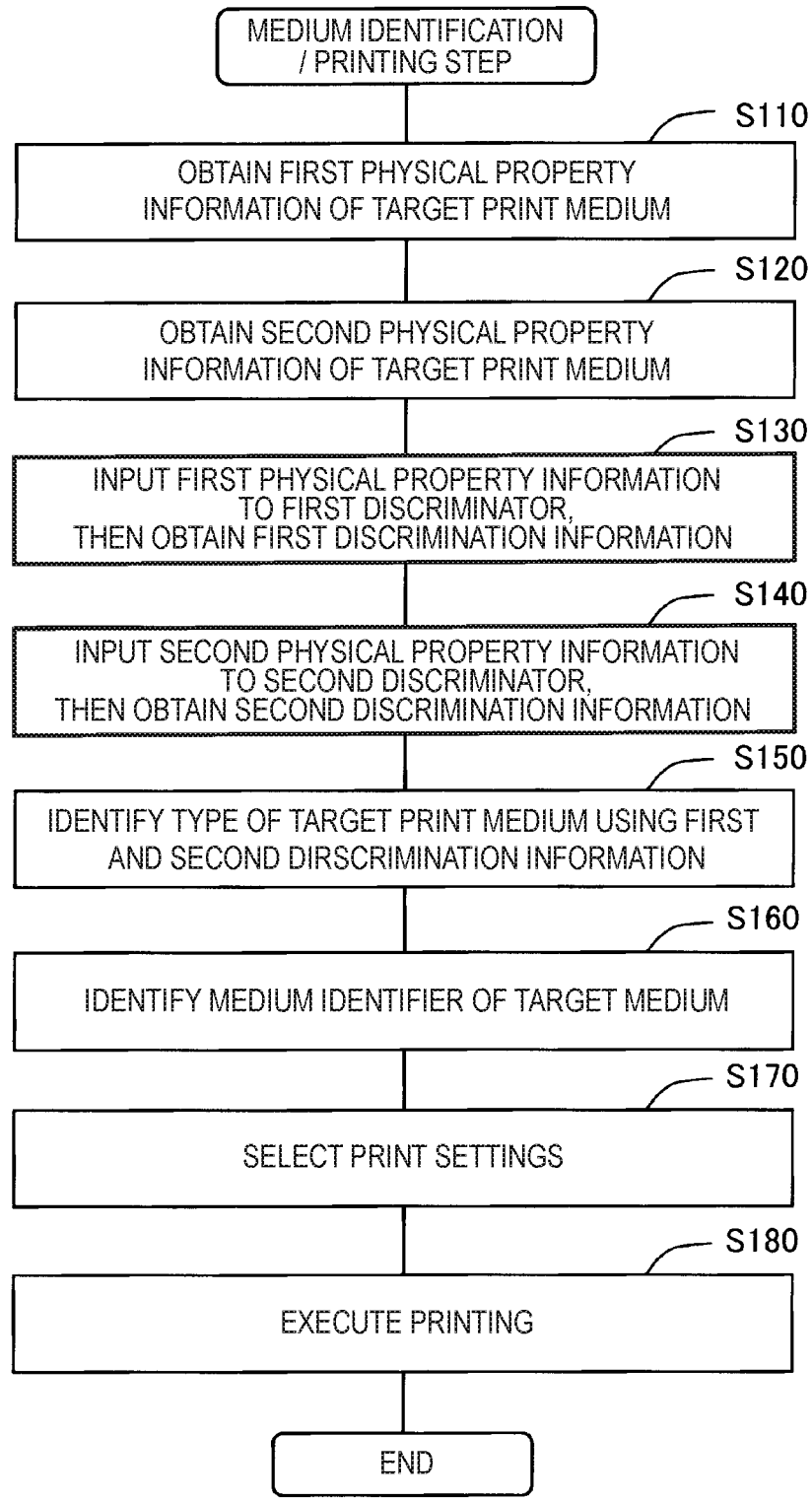
FIG. 10 is a flowchart showing a processing procedure of a medium identification/printing step.

FIG. 10 is a flowchart showing a processing procedure of the medium identification/printing step using the pre-trained discriminators 201 and 202. This medium identification/printing step is executed, for example, by the user of the printer 10. In step S110, the medium identification processing section 118 obtains the first physical property information of the target print medium, which is the print medium to be processed, and in step S120, the second physical property information is obtained. As mentioned above, in this embodiment, the first physical property information is the spectral reflectance $R1(\lambda)$ of an unprinted area, and the second physical property information is the reflectance distribution $R2(\theta)$ of an unprinted area.

In step S130, the medium identification processing section 118 inputs the first physical property information of the target print medium to the pre-trained first discriminator 201 to obtain the first discrimination information. As the first discrimination information, either the similarity $S1(i)$ for each class calculated by the similarity calculation section 271 or the classification output value $Class1(i)$ output from the output layer, ClassVN layer 261, can be used. This point will be described later.

In step S140, the medium identification processing section 118 inputs the second physical property information of the target print media to the pre-trained second discriminator 202 to obtain the second discrimination information. As the second discrimination information, either the similarity $S2(i)$ for each class calculated by the similarity calculation section 272 or the classification output value $Class2(i)$ output from the output layer, ClassVN layer 262, can be used.

In step S150, the medium identification processing section 118 identifies the type of the target print medium by using the first discrimination information obtained in step S130 and the second discrimination information obtained in step S140.

The similarity $S1(i)$ for each class as the first discrimination information can be calculated, for example, using the following formula.

$$S1(i)=\max[G\{Sp(x,y),KSp(i)\}] \quad (2)$$

Here, i is ordinal number for multiple classes, G {a, b} is a function to find the similarity between a and b, Sp (x, y) is feature spectrum at all planar positions (x, y) obtained according to input data, KSp (i) is all known feature spectrum associated with a particular class i, and max [X] is a logical operation that takes the maximum value of X. As the function G {a, b} for the similarity, for example, a formula for cosine similarity or a formula for distance based similarity can be used.

The similarity $S1(i)$ is the maximum value of the similarities calculated between each of the feature spectrum Sp (x, y) at all planar positions (x, y) of the ConvVN2 layer 251 and each of all known feature spectrum KSp (i) corresponding to a particular class i. Such similarity $S1(i)$ is obtained for each of the m number classes i corresponding to m number of labels Lb. The similarity $S1(i)$ represents the degree to which the first physical property information of the target print medium is similar to the first physical property information of each class. The similarity $S2(i)$ for each class as the second discrimination information is calculated in the same way as the similarity $S1(i)$.

For example, one of the following methods can be employed to identify the type of target print medium using the first discrimination information and the second discrimination information.

Identification Method M1

If the maximum value of integration decision value Sa(i) by class given by the following formula is greater than or equal to the predetermined decision threshold value, the class corresponding to the maximum value is identified as the target print medium type.

$$Sa(i)=c1\times S1(i)+c2\times S2(i) \quad (3a)$$

Here, i is an ordinal number indicating the class, and c1 and c2 are weights that are different from each other and that are non-zero. The integration decision value Sa(I) is the sum of similarity $S1(i)$ and similarity $S2(i)$ using different weights. If the maximum value of the integration decision value Sa(i) is less than the decision threshold value, the type of the target print medium is determined to be unknown. According to this identification method M1, the two similarities $S1(i)$ and $S2(i)$ can be used to accurately identify the type of the target print medium.

The weights c1 and c2 in the formula (3a) above may be equal to each other. However, if these weights c1 and c2 are different values, that is, if different weights are used for the similarity $S1(i)$ obtained from the first characteristic information and the similarity $S2(i)$ obtained from the second characteristic information, the type of print medium m may be identified more precisely according to the two types of characteristic information.

Identification Method M2

If the maximum value of integration decision value Sb(i) for each class given by the following formula is greater than or equal to the predetermined decision threshold value, the class corresponding to the maximum value is identified as the target print medium type.

$$Sb(i)=c1\times Class1(i)+c2\times Class2(i) \quad (3b)$$

This integration decision value Sb(i) replaces the similarities $S1(i)$ and $S2(i)$ in the identification method M1 described above with the classification output values $Class1(i)$ and $Class2(i)$. In this identification method M2, the target print medium can be identified by using the classification output values $Class1(i)$ and $Class2(i)$ as the first and second discrimination information, respectively.

Identification Method M3

If integration decision value Sc given by the following formula is greater than or equal to the predetermined decision threshold value, the class corresponding to the integration decision value Sc is identified as the type of the target print medium.

$$Sc=\max[S1(i),S2(i)] \quad (3c)$$

This integration decision value Sc is a maximum value of the similarities $S1(i)$ and $S2(i)$ for each class. If the integration decision value Sc is less than the decision threshold value, the type of the target print medium is determined to be unknown. Even when this identification method M3 is used, the type of the target print medium can be accurately identified using the two similarities $S1(i)$ and $S2(i)$.

Identification Method M4

If an integration decision value Sd given by the following formula is greater than or equal to the predetermined decision threshold value, the class corresponding to the integration decision value Sd is identified as the type of the target print medium.

$$Sd=\max[Class1(i),Class2(i)] \quad (3d)$$

The integration decision value Sd replaces the similarities $S1(i)$ and $S2(i)$ in the Identification method M3 described above with the classification output values $Class1(i)$ and $Class2(i)$. Even when this identification method M4 is used, the type of the target print medium can also be identified by using the classification output values Class1($i$) and Class2($i$) as the first and second discrimination information, respectively.

According to the above identification methods M1 to M4, it is possible to identify the type of the target print medium by using the first discrimination information and the second discrimination information. As an example, two types of print media, black medium and silver medium with specular gloss, were identified according to the identification method M1, using the spectral reflectance R1($\lambda$) as the first physical property information and the reflectance distribution R2($\theta$) as the second physical property information. As a result, both media could be distinguished and identified with high accuracy. On the other hand, when only the first discriminator 201 was used for discrimination, it was not always possible to distinguish and identify black medium and silver medium with specular gloss. The reason for this is presumably that both the black medium and the silver medium with specular gloss have small diffuse reflection components.

When the target print medium type is thus identified, in step S160, the medium identification processing section 118 determines its medium identifier according to the identified type of the target print medium. This process is performed, for example, by referring to the medium identifier list IDL shown in FIG. 6. In step S170, the print processing section 112 selects the print settings according to the medium identifier. This process is performed by referring to the print setting table PST shown in FIG. 7. In step S180, the print processing section 112 executes printing according to the print settings. If the target print media type is determined to be unknown in step S150, the process in FIG. 10 is terminated without performing the processes of step S160 and on.

As described above, in this embodiment, the type of the target print medium is identified by using the first discrimination information obtained by inputting the first physical property information of the target print medium to the first discriminator 201 and the second discrimination information obtained by inputting the second physical property information of the target print medium to the second discriminator 202. Therefore, the type of the target print medium can be accurately identified even in the case of print medium with subtle differences.

In the above described embodiment, the discriminators 201 and 202 are configured using the vector neural network disclosed in JP-A-2021-189730, but a capsule network disclosed in U.S. Pat. No. 5,210,798 or International Publication 2019/083553 may be used instead of this. Instead of a vector neural network, a convolutional neural network with scalar neurons may be used to construct the discriminators 201 and 202. Alternatively, other types of machine learning models such as a support vector machine or a decision tree, and the like, may be used to construct the discriminators 201 and 202.

Other Embodiments

The present disclosure is not limited to the embodiments described above, but can be realized in various forms without departing from the scope of the present disclosure. For example, the present disclosure can also be realized by the following aspects. The technical features in the above embodiments that correspond to the technical features in each aspect described below can be replaced or combined as appropriate to solve some or all of the issues of this disclosure or to achieve some or all of the effects of this disclosure. In addition, if a technical feature is not described as an essential feature in the present specification, the technical feature can be deleted as appropriate.

(1) A first aspect of the present disclosure provides a print medium identification method to identify the type of print medium. The method includes (a) a step of obtaining first physical property information about a print medium; (b) a step of obtaining second physical property information, which is different from the first physical property information, about the print medium; (c) a step of obtaining first discrimination information for discriminating the type of print medium by inputting the first physical property information to a first discriminator configured as a pre-trained machine learning model; (d) a step of obtaining second discrimination information for discriminating the type of print medium by inputting the second physical property information to a second discriminator configured as a pre-trained machine learning model; (e) a step of identifying the type of print medium using the first discrimination information and the second discrimination information.

According to this method, the type of target print medium can be identified with high accuracy, even if there are subtle differences between print media (2) In the above print medium identification method, the step (e) may include a step of determining the type of print medium in accordance with an integration decision value obtained by adding the first discrimination information and the second discrimination information using different weights.

According to this method, the type of the print medium can be accurately identified using both of the two physical property information.

(3) In the above print medium identification method, each of the first discrimination information and the second discrimination information may be similarities of each type of print medium.

According to this method, the type of print medium can be accurately identified using the similarities for each type of print medium.

(4) In the above print medium identification method, each of the first discriminator and the second discriminator may include a vector neural network having a plurality of vector neuron layers, and may be configured to classify each of the plurality of types of the print medium into a plurality of classes, and each of the first discrimination information and the second discrimination information may be similarities for each class calculated between a feature spectrum obtained from an output of a specific layer of the machine learning model and a known feature spectrum group created in advance in relation to the plurality of classes.

According to this method, the similarity of each type of print medium can be appropriately calculated.

(5) In the above print medium identification method, the specific layer may have a configuration in which vector neurons arranged on a plane defined by a first axis and a second axis are arranged as a plurality of channels along a third axis whose direction is different from those of the first and second axes, and the feature spectrum may be any of the following: (i) a first type of feature spectrum in which a plurality of element values of an output vector of a vector neuron at a planar location in one of specific layers are arranged over a plurality of channels along the third axis, (ii) a second type of feature spectrum obtained by multiplying each element value of the first type of feature spectrum by an activation value corresponding to vector length of the output vector, and (iii) a third type of feature spectrum in which the activation value at one planar location in one of specific layers is arranged over a plurality of channels along the third axis.

According to this method, the feature spectrum can be easily obtained.

(6) In the above print medium identification method, each of the first physical property information and the second physical property information may include one or more of spectral reflectance, spectral transmittance, reflectance distribution, an image captured by a visible light camera, thickness, moisture content, weight, friction coefficient, and an ultrasonic inspection image.
According to this method, the type of print medium can be identified by using any one of various physical property information about the print medium.

(7) In the above print medium identification method, the first physical information may be spectral property reflectance, and the second physical property information may be reflectance distribution that includes reflectance ratio at multiple reflection angles for one or more incidence angles.
According to this method, the print medium whose type cannot be identified by spectral reflectance alone or by reflectance distribution alone can be identified using both of them.

(8) According to a second aspect of the present disclosure, a print medium identification system is provided that executes a medium identification process to identify a type of print medium. The system includes; a memory for storing a first discriminator and a second discriminator configured as pre-trained machine learning models, and a processor for executing the medium identification process by using the first discriminator and the second discriminator, wherein the processor is configured to execute (a) a process of obtaining first physical property information about a print medium; (b) a process of obtaining second physical property information which is different from the first physical property information about the print medium; (c) a process of obtaining first discrimination information for discriminating the type of print medium by inputting the first physical property information to the first discriminator; (d) a process of obtaining second discrimination information for discriminating the type of print medium by inputting the second physical property information to the second discriminator; and (e) a process of identifying the type of print medium using the first discrimination information and the second discrimination information.

The present disclosure can also be realized in various forms other than the above described. For example, the present disclosure can be realized in the form of a computer program for realizing the functions of the print medium identification system, a non-transitory storage medium storing the computer program, or the like.

What is claimed is:

1. A print medium identification method for identifying a type of print medium, comprising:
    (a) a step of obtaining first physical property information about a print medium;
    (b) a step of obtaining second physical property information, which is different from the first physical property information, about the print medium;
    (c) a step of obtaining first discrimination information for discriminating the type of print medium by inputting the first physical property information to a first discriminator configured as a pre-trained machine learning model using a first teacher data group, which is a collection of the first physical property information;
    (d) a step of obtaining second discrimination information for discriminating the type of print medium by inputting the second physical property information to a second discriminator configured as a pre-trained machine learning model using a second teacher data group, which is a collection of the second physical property information; and
    (e) a step of identifying the type of print medium using the first discrimination information and the second discrimination information.

2. A print medium identification method for identifying a type of print medium, comprising:
    (a) a step of obtaining first physical property information about a print medium;
    (b) a step of obtaining second physical property information, which is different from the first physical property information, about the print medium;
    (c) a step of obtaining first discrimination information for discriminating the type of print medium by inputting the first physical property information to a first discriminator configured as a pre-trained machine learning model;
    (d) a step of obtaining second discrimination information for discriminating the type of print medium by inputting the second physical property information to a second discriminator configured as a pre-trained machine learning model;
    (e) a step of identifying the type of print medium using the first discrimination information and the second discrimination information,
    wherein the step of identifying includes a step of determining the type of print medium in accordance with an integration decision value obtained by adding the first discrimination information and the second discrimination information using different weights.

3. The print medium identification method according to claim 2, wherein:
    each of the first discrimination information and the second discrimination information are similarities of each type of print medium.

4. The print medium identification method according to claim 3, wherein:
    each of the first discriminator and the second discriminator includes a vector neural network having a plurality of vector neuron layers and is configured to classify each of the plurality of types of the print medium into a plurality of classes, and
    each of the first discrimination information and the second discrimination information is similarities for each class calculated between a feature spectrum obtained from an output of a specific layer of the machine learning model and a known feature spectrum group created in advance in relation to the plurality of classes.

5. The print medium identification method according to claim 4, wherein
    the specific layer has a configuration in which vector neurons arranged on a plane defined by a first axis and a second axis are arranged as a plurality of channels along a third axis whose direction is different from those of the first and second axes, and
    the feature spectrum is any of the following:
    (i) a first type of feature spectrum in which a plurality of element values of an output vector of a vector neuron at a planar location in one of specific layers are arranged over a plurality of channels along the third axis,
    (ii) a second type of feature spectrum obtained by multiplying each element value of the first type of feature spectrum by an activation value corresponding to vector length of the output vector, and (iii) a third type of feature spectrum in which the activation value at one planar location in one of specific layers is arranged over a plurality of channels along the third axis.

6. The print medium identification method according to claim 1, wherein:
each of the first physical property information and the second physical property information includes one or more of spectral reflectance, spectral transmittance, reflectance distribution, an image captured by a visible light camera, thickness, moisture content, weight, friction coefficient, and an ultrasonic inspection image.

7. The print medium identification method according to claim 6, wherein
the first physical property information is spectral reflectance, and
the second physical property information is reflectance distribution that includes reflectance ratio at multiple reflection angles for one or more incidence angles.

8. A print medium identification system for executing medium identification process for identifying a type of print medium, the medium identification process system comprising:
a memory for storing a first discriminator and a second discriminator configured as pre-trained machine learning models, and
a processor for executing the medium identification process by using the first discriminator and the second discriminator, wherein:
the processor is configured to execute
(a) a process of obtaining first physical property information about a print medium;
(b) a process of obtaining second physical property information which is different from the first physical property information about the print medium;
(c) a process of obtaining first discrimination information for discriminating the type of print medium by inputting the first physical property information to the first discriminator using a first teacher data group, which is a collection of the first physical property information;
(d) a process of obtaining second discrimination information for discriminating the type of print medium by inputting the second physical property information to the second discriminator using a second teacher data group, which is a collection of the second physical property information; and
(e) a process of identifying the type of print medium using the first discrimination information and the second discrimination information.

9. A print medium identification method for identifying a type of print medium, comprising:
(a) a step of obtaining first physical property information about a print medium;
(b) a step of obtaining second physical property information, which is different from the first physical property information, about the print medium;
(c) a step of obtaining first discrimination information for discriminating the type of print medium by inputting the first physical property information to a first discriminator configured as a pre-trained machine learning model;
(d) a step of obtaining second discrimination information for discriminating the type of print medium by inputting the second physical property information to a second discriminator configured as a pre-trained machine learning model;
(e) a step of identifying the type of print medium using the first discrimination information and the second discrimination information, wherein
the first physical property information is spectral reflectance, and
the second physical property information is reflectance distribution that includes reflectance ratio at multiple reflection angles for one or more incidence angles.

10. The print medium identification method according to claim 9, wherein:
the step (e) includes a step of determining the type of print medium in accordance with an integration decision value obtained by adding the first discrimination information and the second discrimination information using different weights.

11. The print medium identification method according to claim 10, wherein:
each of the first discrimination information and the second discrimination information are similarities of each type of print medium.

12. The print medium identification method according to claim 11, wherein:
each of the first discriminator and the second discriminator includes a vector neural network having a plurality of vector neuron layers and is configured to classify each of the plurality of types of the print medium into a plurality of classes, and
each of the first discrimination information and the second discrimination information is similarities for each class calculated between a feature spectrum obtained from an output of a specific layer of the machine learning model and a known feature spectrum group created in advance in relation to the plurality of classes.

13. The print medium identification method according to claim 12, wherein
the specific layer has a configuration in which vector neurons arranged on a plane defined by a first axis and a second axis are arranged as a plurality of channels along a third axis whose direction is different from those of the first and second axes, and
the feature spectrum is any of the following:
(i) a first type of feature spectrum in which a plurality of element values of an output vector of a vector neuron at a planar location in one of specific layers are arranged over a plurality of channels along the third axis,
(ii) a second type of feature spectrum obtained by multiplying each element value of the first type of feature spectrum by an activation value corresponding to vector length of the output vector, and
(iii) a third type of feature spectrum in which the activation value at one planar location in one of specific layers is arranged over a plurality of channels along the third axis.

* * * * *